(12) United States Patent
Park et al.

(10) Patent No.: US 7,324,478 B2
(45) Date of Patent: Jan. 29, 2008

(54) APPARATUS AND METHOD FOR DECIDING ACCESS SYSTEM BASED ON WLAN SIGNAL STRENGTH IN WLAN/MOBILE NETWORK INTERWORKING SYSTEM, AND MOBILE TERMINAL THEREFOR

(75) Inventors: Seong-Soo Park, Seoul (KR);
Chan-Jeom Phang, Seoul (KR);
Dong-Hahk Lee, Gyeonggi-Do (KR);
Yong-Sik Shin, Seoul (KR); Sang Shin Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 953 days.

(21) Appl. No.: 10/425,141

(22) Filed: Apr. 28, 2003

(65) Prior Publication Data
US 2004/0044887 A1 Mar. 4, 2004

(30) Foreign Application Priority Data
Aug. 29, 2002 (KR) .................... 10-2002-0051354

(51) Int. Cl.
*H04Q 7/00* (2006.01)
(52) U.S. Cl. ............... 370/331; 370/338; 370/329; 455/436; 455/452.2; 455/134
(58) Field of Classification Search .............. None
See application file for complete search history.

(56) References Cited

U.S. PATENT DOCUMENTS

| | | | |
|---|---|---|---|
| 6,243,581 B1* | 6/2001 | Jawanda | 455/432.2 |
| 7,028,097 B2* | 4/2006 | Bard | 709/232 |
| 7,039,027 B2* | 5/2006 | Bridgelall | 370/329 |
| 7,133,669 B2* | 11/2006 | Nair et al. | 455/432.1 |
| 2002/0085516 A1* | 7/2002 | Bridgelall | 370/329 |
| 2004/0114553 A1* | 6/2004 | Jiang et al. | 370/328 |

FOREIGN PATENT DOCUMENTS

| | | |
|---|---|---|
| EP | 685974 A1 | 12/1995 |
| EP | 998094 A2 | 5/2000 |
| KR | 1020030037373 A | 5/2003 |
| WO | WO 00/38465 A1 | 6/2000 |

* cited by examiner

*Primary Examiner*—Chirag G. Shah
(74) *Attorney, Agent, or Firm*—Lahive & Cockfield, LLP

(57) ABSTRACT

The present invention discloses an apparatus and method for deciding an access system based on WLAN signal strength in a WLAN/mobile phone network interworking system, and a mobile terminal therefor. The method for deciding the access system based on the WLAN signal strength in the WLAN/mobile phone network interworking system includes an initialization step for performing an initialization process on a WLAN driver module and a mobile phone network driver module, and measuring and displaying WLAN signal strength, a service decision step for selecting a WLAN service or mobile phone network service according to the measured WLAN signal strength, and a service access step for enabling the corresponding driver module to access the service decided in the service decision step. The apparatus and method for deciding the access system based on the WLAN signal strength provide a roaming service by efficiently interworking a WLAN which provides a high speed internet access service based on hot spots and a mobile phone network which provides a national communication service, to facilitate activation of the wireless internet service.

9 Claims, 3 Drawing Sheets

APPARATUS AND METHOD FOR DECIDING ACCESS SYSTEM BASED ON WLAN SIGNAL STRENGTH IN WLAN/MOBILE NETWORK INTERWORKING SYSTEM, AND MOBILE TERMINAL THEREFOR

BACKGROUND OF THE INVENTION

1. Field of the Invention

The present invention relates to an apparatus and method for deciding an access system based on WLAN signal strength in a WLAN/mobile network interworking system, and in particular to an apparatus and method for deciding an access system based on WLAN signal strength in a WLAN/mobile network interworking system which can provide a roaming service by interworking a WLAN which provides a high speed wireless internet access service based on hot spots, and a mobile network which provides a national communication service.

2. Description of the Background Art

A WLAN is a system designed to provide a high speed wireless data service based on Ethernet. It has been used as a network solution in non-cabled places, such as factories, conference rooms and exhibition halls.

The WLAN serves to cut down network building expenses and improve business efficiency by supplying low-priced service equipment by partially restricting mobility of terminals, and thus application areas thereof have been gradually expanded. In addition, demands of users for the internet access have considerably increased and expanded into wireless sections due to huge distributions of a very high speed internet service. Thus, communication providers in the country or abroad attempt to provide the very high speed internet service by using the WLAN.

However, differently from a mobile network, the WLAN restricts mobility supports and thus fails to widely provide the service.

That is, the WLAN using 2.4 GHz band restricts outputs below 100 mW, and thus a service area of one access point exists within a 100 m-radius, which is clearly compared with a few hundreds m to a few Km of the mobile network. Accordingly, in order to obtain the same service coverage as the mobile network, the WLAN requires a lot of access points, which incurs large building expenses.

Moreover, the WLAN does not provide mobility functions such as diversity function, signal track function using fingers, and hand-off function as in the mobile network, and thus fails to flexibly support the internet service for a high speed mobile object.

Nevertheless, the WLAN is regarded as an important solution for providing the high speed wireless internet service because it can provide the high speed internet service at a low price in a specific area. Actually, demands for the high speed wireless internet access have been mostly generated in a fixed or walking state, specifically main business areas or public sections which a lot of general users crowd in.

Therefore, when the WLAN which provides the high speed wireless internet access service in a specific area and the mobile network which shows a low speed data rate but provides the internet access service regardless of places are interworked, namely when a communication provider provides the very high speed wireless data service by using the WLAN, the wireless internet access service can be efficiently provided by using the WLAN in the area where a lot of users demand the wireless data service, and the mobile network in the area where a small number of users demand the wireless data service. However, in order to use the WLAN to compensate for the wireless internet access service of the mobile network, a roaming service between the WLAN and the mobile network is necessary for service activation.

That is, a terminal must be provided with an access function to the mobile network and the WLAN, for using the WLAN service in the WLAN service area and the mobile network service in the other areas. Here, it should be determined whether to provide portability or roaming service for guaranteeing continuity of the service. When the terminal simply provides portability, the user may have to intercept the current service and select a wireless interface for re-access according to service areas. In the case that the terminal provides the roaming service, the wireless interface is automatically selected in order for the user to continuously use the service.

However, technical problems such as confirmation of service areas, roaming decisions, and access procedures between different wireless interfaces must be solved in advance so as to continuously and automatically provide the roaming service between the mobile network and the WLAN.

SUMMARY OF THE INVENTION

Accordingly, it is an object of the present invention to provide an apparatus and method for deciding a WLAN/mobile network access system based on WLAN signal strength which can provide a roaming service between a WLAN and a mobile network by using a terminal accessible to the WLAN and the mobile network.

In order to achieve the above-described object of the invention, there is provided a mobile terminal which includes a network interface card and a wireless modem function to access a WLAN and a mobile network in a WLAN/mobile network interworking system composed of an access point, an authentication server, a base station, a base station controller, a mobile switching center and a packet data service node.

In addition, there is provided a method for deciding an access system based on WLAN signal strength in a WLAN/mobile network interworking system, including: an initialization step for performing an initialization process on a WLAN driver module and a mobile network driver module, and measuring and displaying WLAN signal strength; a service decision step for selecting a WLAN service or mobile network service according to the measured WLAN signal strength; and a service access step for enabling the corresponding driver module to access the service decided in the service decision step.

BRIEF DESCRIPTION OF THE DRAWINGS

The present invention will become better understood with reference to the accompanying drawings which are given only by way of illustration and thus are not limitative of the present invention, wherein:

FIG. 1 is a structure view illustrating a WLAN/mobile network interworking system which the present invention can be applied to;

DETAILED DESCRIPTION OF THE PREFERRED EMBODIMENTS

An apparatus and method for deciding an access system based on WLAN signal strength in a WLAN/mobile network interworking system in accordance with a preferred embodiment of the present invention will now be described in detail with reference to the accompanying drawings.

Figure 1:
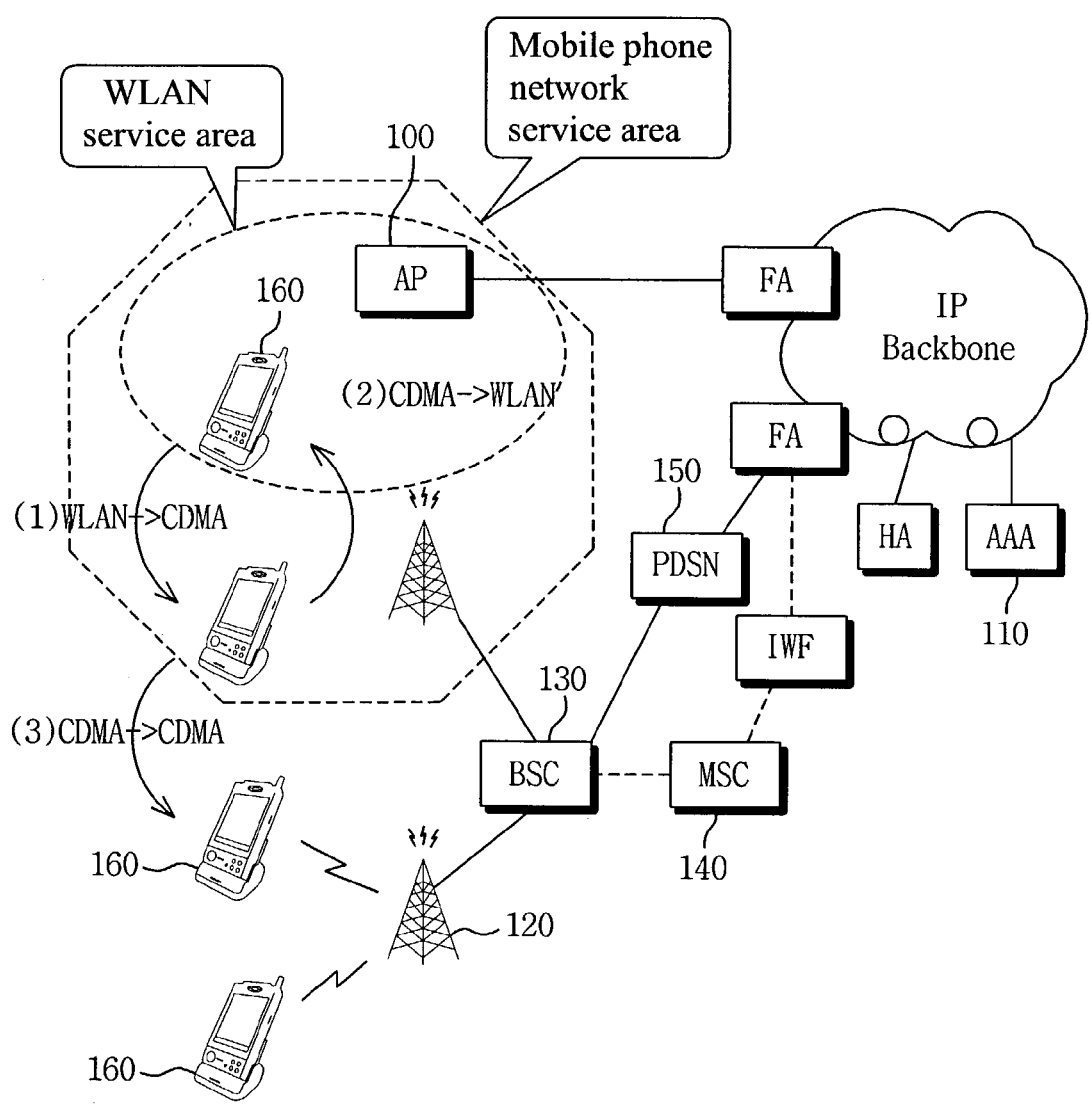

FIG. 1 is a structure view illustrating the WLAN/mobile network interworking system which the present invention can be applied to.

Referring to FIG. 1, the WLAN/mobile network interworking system composed of an access point (AP) 100, an authentication server (AAA) 110, a base station (BTS) 120, a base station controller (BSC) 130, a mobile switching center (MSC) 140 and a packet data service node (PDSN) 150 includes mobile terminals 160 which respectively have a network interface card (NIC) and a wireless modem function to access a WLAN and a mobile network.

Here, the WLAN includes the terminals 160 where the NIC are mounted, and the AP 100 for connecting the terminals 160 to the network. The AP 100 allows or rejects access of the corresponding terminal through the interface with the AAA 110.

The mobile network includes the terminals 160 having the wireless modem function, the BTS 120, the BSC 130 for transmitting signals to the network, the MSC 140 and the PDSN 150.

Integration of different wireless interfaces or higher-level control of the wireless interfaces are required to interwork the WLAN using 2.4 GHz band and the mobile network using 800 MHz band (or 1.8 GHz band). It is actually impossible to integrate the wireless interfaces of the WLAN and the mobile network. It is thus preferable to control the wireless access in the higher level of the wireless interfaces. Accordingly, the standardized mobile terminal provides mobility of the data service by using a mobile IP (MIP) guaranteeing mobility of the data service regardless of the wireless interfaces.

Figure 2:
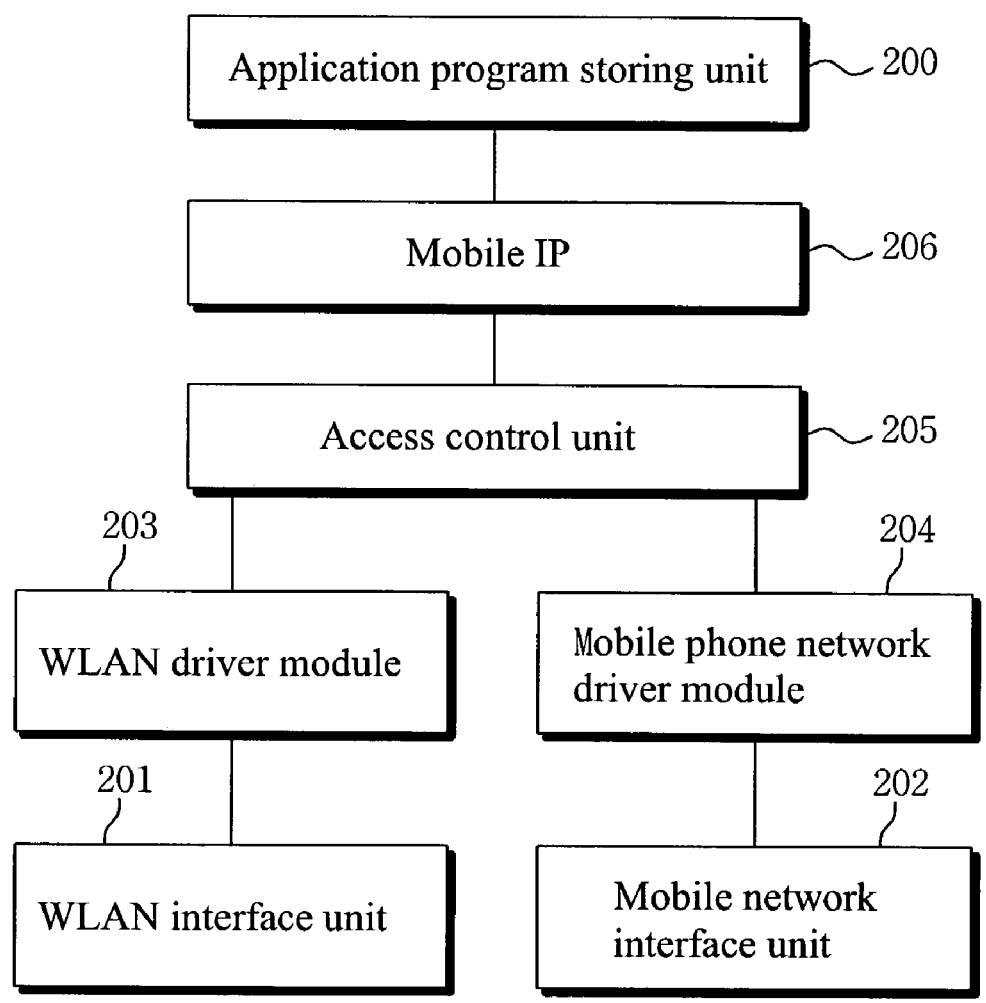
FIG. 2 is a structure view illustrating a mobile terminal in a state where a WLAN and a mobile network are interworked in accordance with the present invention.

FIG. 2 is a structure view illustrating the mobile terminal in a state where the WLAN and mobile network are interworked by using the MIP.

As illustrated in FIG. 2, each of the mobile terminals 160 includes an application program storing unit 200, a WLAN interface unit 201, a mobile network interface unit 202, a WLAN driver module 203, a mobile network driver module 204, an MIP 206, and an access control unit 205 for deciding a data transmission/reception interface. Internet service user applications (VOD, FTP, etc.) such as motion picture or file download services communicate with the MIP 206 which are not influenced by kinds of the wireless interfaces. The MIP 206 prevents the IP from being changed due to terminal access network variations, to continuously maintain the user access.

The access control unit 205 receives data from the wireless interface, and transmits the received data to the WLAN driver module 203. Accordingly, the access control unit 205 actually decides the data transmission/reception interface. Here, the access control unit 205 performs a function of ordering data packets, a function of transmitting/receiving data to/from the WLAN/mobile network interface, a function of initializing and activating the WLAN/mobile network, and a function of changing the wireless interface under given conditions. In detail, the function of ordering data packets transmits the data packets to an upper layer according to their numbers, and the function of transmitting/receiving data to/from the WLAN/mobile network interface transmits/receives the corresponding data to/from a wanted interface. In addition, the function of initializing and activating the WLAN/mobile network converts the corresponding interface equipment (NIC for WLAN, modem for mobile network) into an available/non-available state, which is executed under the interface defined by the corresponding manufacturing company. The function of changing the wireless interface selects the wireless interface by monitoring a wireless channel state.

The operation of the present invention will now be explained with reference to FIG. 3.

Figure 3:
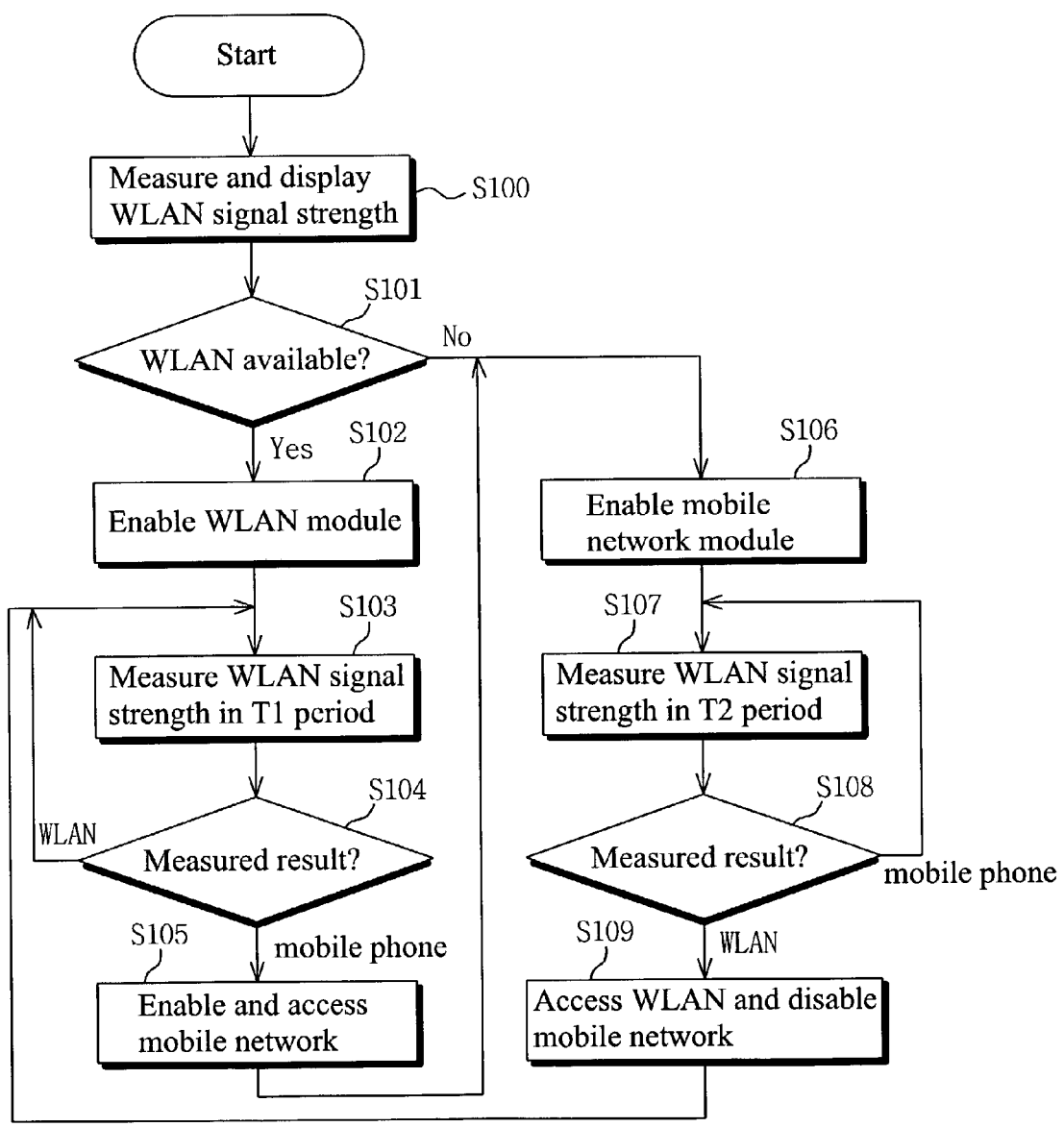
FIG. 3 is a flowchart showing an operation of an access control unit in accordance with the present invention.

FIG. 3 is a flowchart showing the operation of the access control nit in accordance with the present invention. As shown in FIG. 3, when the mobile terminal 160 starts to use the wireless internet, the access control unit 205 initializes the WLAN driver module 203 and the mobile network driver module 204, and measures and displays WLAN signal strength. (S100).

The access control unit 205 decides whether the measured WLAN signal strength WLAN_init is greater than a threshold value TH_init for setting up a WLAN mode (S101). If so, the access control unit 205 maintains the WLAN driver module 203 in an enable state (mobile phone driver module in a disable state) (S102), and if not, the access control unit 205 maintains the WLAN driver module 203 in a disable state and the mobile network driver module 204 in an enable state (S106).

In a state where the WLAN driver module 203 is enabled, the access control unit 205 measures WLAN signal strength in T1 period (S103), and decides where to maintain the WLAN mode or convert it into a mobile network mode on the basis of the measured WLAN signal strength (S104).

If the WLAN signal strength becomes lower than a predetermined level and thus the WLAN mode needs to be converted into the mobile network mode, the access control unit 205 enables the mobile network driver module 204 and then disables the WLAN driver module 203 (S105).

If the WLAN signal strength is maintained lower than the predetermined level not to communicate through the WLAN, the access control unit 205 enables the mobile network driver module 204 to perform communication. In this case, the access control unit 205 measures WLAN signal strength in T2 period (S107), and decides whether to convert the current mode into the WLAN mode on the basis of the measured signal strength (S108).

If the WLAN signal strength is maintained over the predetermined level and thus the mobile network mode needs to be converted into the WLAN mode, the access control unit 205 enables the WLAN driver module 203 and then disables the mobile phone driver module 204 (S109).

The process for deciding the communication mode based on the WLAN signal strength will now is described in more detail.

Firstly, a number (N) of the measured WLAN signal strength values is defined. The number (N) of the values is reset in every communication initialization or mode variation. The WLAN signal strength is measured and stored in T1 period in the WLAN mode and T2 period in the mobile phone network mode. Only recently-measured N values are maintained.

That is, the signal strength is measured in T1 period in the WLAN mode, and the communication mode is decided according to the measured values. Here, when an average of the N WLAN signal strength values is smaller than a predetermined average WLAN_Mode_Average, or when the recently-measured N1 values are smaller than the average WLAN_Mode_Average, the WLAN mode is converted into the mobile phone network mode. In other cases, the WLAN mode is maintained.

In addition, the WLAN signal strength is measured in T2 period in the mobile phone network mode, and the communication mode is decided according to the measured values. Here, when an average of the N WLAN signal strength values is greater than a predetermined average CDMA_Mode_Average, or when the recently-measured N1 values are greater than the average CDMA_Mode_Average, the mobile phone network mode is converted into the WLAN mode. In other cases, the mobile phone network mode is maintained.

Here, N, N1, T1, T2, WLAN_Mode_Average and CDMA_Mode_Average can be varied under the real operation environments. Generally, N>=N1 and T1<=T2 are satisfied.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

As discussed earlier, in accordance with the present invention, the apparatus and method for deciding the access system based on the WLAN signal strength in the WLAN/mobile network interworking system efficiently interwork the WLAN and the mobile network, to facilitate activation of the wireless internet service.

What is claimed is:

1. A method for deciding an access system based on WLAN signal strength in a WLAN/mobile phone network interworking system, comprising:
    an initialization step for performing an initialization process on a WLAN driver module and a mobile network driver module, and measuring and displaying WLAN signal strength;
    a service decision step for selecting a WLAN service or mobile phone network service according to the measured WLAN signal strength; and
    a service access step for enabling the corresponding driver module to access the service decided in the service decision step, wherein the service decision step comprises:
    a first step for deciding whether the measured WLAN signal strength, value is greater than a reference value for setting a WLAN mode; and
    a second step for enabling a WLAN driver module and disabling a mobile phone network driver, module when the measured value is greater than the reference value in the first step, and disabling the WLAN driver module and enabling the mobile network driver module when the measured value is smaller than the reference value;
    wherein, in the service access step, when a communication mode of a terminal is a WLAN mode, if an average of N WLAN signal strength values measured for a predetermined period is smaller than a reference value, or if N1 (>=N) WLAN signal strength values are all smaller than the reference value, the WLAN mode is converted into a mobile phone network mode.

2. The method according to claim 1, wherein the initialization step defines a number (N) of the measured WLAN signal strength values, and resets the number in every communication initialization or communication mode variation.

3. The method according to claim 1, wherein the service access step decides a communication mode on the basis of the WLAN signal strength measured for a predetermined time, enables the driver module corresponding to the succeeding service, and disables the driver module of the current service, to prevent the communication mode from being frequently changed due to rapid variations of the WLAN signal strength.

4. The method according to claim 1, wherein, in the service access step, when a communication mode of a terminal is a WLAN mode, if an average of a predetermined number (N) of WLAN signal strength values measured for a predetermined period is smaller than a reference value, the WLAN mode is converted into a mobile phone network mode.

5. The method according to claim 1, wherein, in the service access step, when a communication mode of a terminal is a WLAN mode, if N1 (>=N) WLAN signal strength values measured for a predetermined period are all smaller than a reference value, the WLAN mode is converted into a mobile phone network mode.

6. The method according to claim 1, wherein, in the service access step, when a communication mode of a terminal is a mobile phone network mode, if an average of a predetermined number (N) of WLAN signal strength values measured for a predetermined period is greater than a reference value, the mobile phone network mode is converted into the WLAN mode.

7. The method according to claim 1, wherein, in the service access step, when a communication mode of a terminal is a mobile phone network mode, if N1 (>=N) WLAN signal strength values measured for a predetermined period are all greater than a reference value, the mobile phone network mode is converted into the WLAN mode.

8. The method according to claim 1, wherein, in the service access step, when a communication mode of a terminal is a mobile phone network mode, if an average of N WLAN signal strength values measured for a predetermined period is greater than a reference value, or if N1 (>=N) WLAN signal strength values are all greater than the reference value, the mobile phone network mode is converted into the WLAN mode.

9. The method according to claim 1, wherein the service decision converts a communication mode to either a (mobile phone network mode or WLAN mode) of a terminal, when the measured WLAN signal strength values are detected to be continuously changed before a predetermined number (N) of values defined in the initialization step are all measured.

* * * * *